United States Patent [19]

Barraud et al.

[11] 4,224,896
[45] Sep. 30, 1980

[54] DEVICE FOR FORMATION AND DEPOSITION OF MONOMOLECULAR LAYERS OF AMPHIPHILIC MOLECULES ON A SUBSTRATE

[75] Inventors: Andre Barraud, Bures-sur-Yvette; Roger Gras, Villiers le Bacee; Michel Vandevyver, Chatenay Malabry, all of France

[73] Assignee: Commissariat a l'Energie Atomique, Paris, France

[21] Appl. No.: 874,533

[22] Filed: Feb. 2, 1978

Related U.S. Application Data

[62] Division of Ser. No. 765,063, Feb. 2, 1977, Pat. No. 4,093,757.

[30] Foreign Application Priority Data

Feb. 11, 1976 [FR] France ............................ 76 03756

[51] Int. Cl.² .................................................. B05C 3/12
[52] U.S. Cl. ................................ 118/402; 118/419
[58] Field of Search ............... 118/603, 602, 610, 402, 118/403, 419; 68/175; 210/DIG. 25, DIG. 26

[56] References Cited

U.S. PATENT DOCUMENTS

| | | | |
|---|---|---|---|
| 2,140,498 | 12/1938 | Dreyer | 118/402 X |
| 2,703,066 | 3/1955 | Speed et al. | 118/67 |
| 3,338,414 | 8/1967 | Lefke et al. | 210/DIG. 26 |
| 3,426,902 | 2/1969 | Kilpert et al. | 210/DIG. 26 |
| 3,940,235 | 2/1976 | Weiler | 118/402 X |
| 4,021,344 | 5/1977 | Webb | 210/DIG. 25 |

*Primary Examiner*—John P. McIntosh
*Attorney, Agent, or Firm*—Lane, Aitken, Ziems, Kice & Kananen

[57] ABSTRACT

The monomolecular layer is first formed from a solution of amphiphilic molecules by introduction of the solution on a liquid surface which is divided into at least two compartments by at least one rotatable and partly immersed horizontal member. The solvent is then removed and the horizontal member is driven in rotation so as to apply a predetermined pressure to said layer as this latter is transferred from one compartment to the next, the layer being finally deposited on a substrate.

18 Claims, 8 Drawing Figures

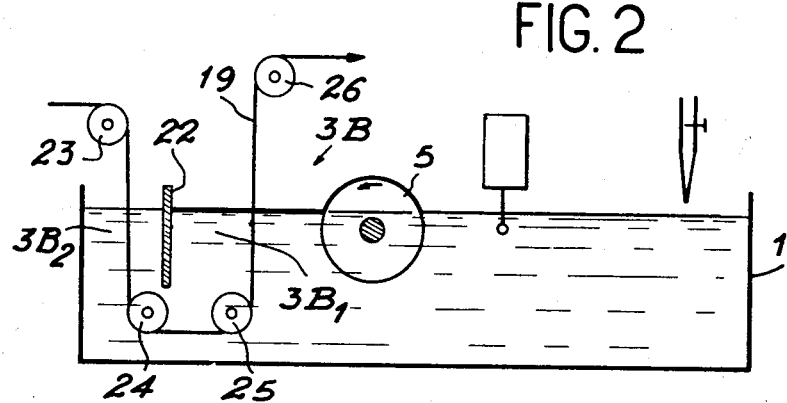
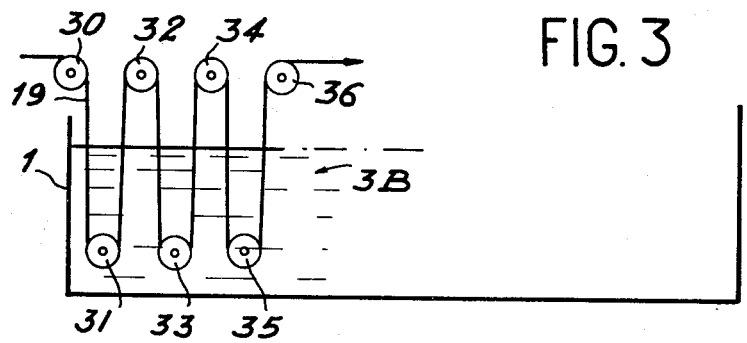
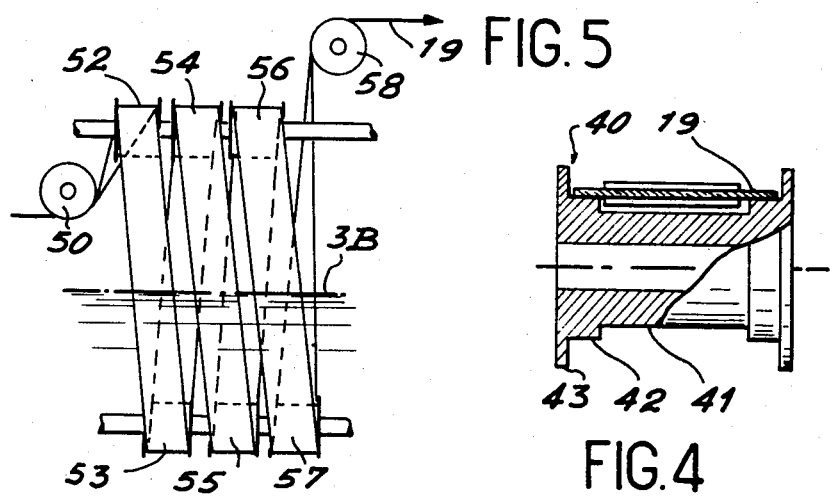

DEVICE FOR FORMATION AND DEPOSITION OF MONOMOLECULAR LAYERS OF AMPHIPHILIC MOLECULES ON A SUBSTRATE

This a division of application Ser. No. 765,063, filed Feb. 2, 1977, now U.S. Pat. No. 4,093,757, issued June 6, 1978.

This invention relates to a method and device for producing and depositing monomolecular layers of amphiphilic molecules on a substrate and is primarily directed to a method and a device for continuously producing and depositing said monomolecular layers on solid substrates.

Monomolecular layers of organic compounds find a large number of applications, especially in the field of electronics in which they are employed for example for the purpose of forming metal-insulator-metal structures in which the thickness of the dielectric layer is controlled with a particularly high degree of accuracy.

One known method for producing and depositing monomolecular layers of amphiphilic molecules has been described by Langmuir (Journal Amer. Chem Soc'y, vol. 57, pp. 1007-1010 (1935)) and consists in forming the monomolecular layer at the surface of a tank filled with a liquid such as water. In accordance with this method, there is introduced on the surface of the liquid a solution of amphiphilic molecules dissolved in a solvent which is not miscible with the liquid of the tank, whereupon the solvent is evaporated so as to form the monomolecular layer. The layer thus formed is then compacted to a predetermined surface pressure and deposited at the surface of a substrate which has previously been immersed in the liquid of the tank by slow upward displacement of this latter while maintaining the layer at said predetermined surface pressure during the period of deposition.

The usual practice adopted for compacting the monomolecular layer consists in making use of a leak-tight floating barrier which is capable of moving over the surface of the liquid of the tank. By displacing said barrier, the area of the monomolecular layer which has previously been formed at the surface of the liquid of the tank is reduced so as to bring it to the desired surface pressure.

When this value is attained, the operation which consists in depositing the layer on the substrate is begun and the surface pressure of the layer is maintained at said value by displacing the floating barrier so as to provide progressive compensation for the space left by the molecules which have been deposited on the substrate. On completion of the operation, the floating barrier is brought back to the immediate vicinity of one of the tank walls in order to ensure that the entire surface of the liquid is again available for the introduction of a fresh quantity of solution of amphiphilic molecules.

This sequential technique does not permit of continuous formation and deposition of monomolecular layers on solids in the form of plastic or metallic bands since it is necessary to replenish the bath and to compact the layer periodically.

The finding which constitutes the precise object of the invention lies in the fact that, by dividing the surface of the liquid contained in the tank into at least two compartments such that two adjacent compartments are separated by a horizontal member which is partly immersed in the liquid of the tank, the monomolecular layer can be formed in one of the compartments, then transferred into the adjacent compartment by causing the member which separates the two compartments to rotate on its own axis. A number of compartments can be arranged in series, each compartment being separated from the adjacent compartment by a rotating member. It has further been discovered that this transfer process makes it possible to apply a predetermined surface pressure to the layer, the value of this pressure being dependent on a number of different parameters which are primarily related to the nature and to the geometry of the members which provide a separation between the compartments. Furthermore, when one of said members is formed of material which does not have any affinity for the solvent, removal of said solvent can be performed at the same time by means of this transfer process.

In this way, it thus proves feasible to carry out the different steps of the method and, by continuously supplying the system within a first compartment, it it possible to deposit continuously on a substrate within another compartment the monomolecular layer which has been transferred into this latter.

One advantage of the method lies in the fact that it is not necessary to machine the walls of the tank since no mechanical barrier is displaced in translational motion in order to subject the layer to compaction.

The method for producing and depositing a monomolecular layer of amphiphilic molecules on a substrate in accordance with the invention comprises a first step of formation of said layer from a solution of said molecules in a solvent by introduction of said solution on a liquid surface and by removal of the solvent, a second step of application of a predetermined surface pressure to the layer thus formed and a third step of deposition of said layer on a substrate. The method essentially consists in carrying out the operation on a liquid surface divided into at least two compartments, two adjacent compartments being separated by a horizontal member which is partly immersed in said liquid and capable of rotating on its own axis, that the solution of said molecules is introduced into one of said compartments, that removal of the solvent is carried out and that transfer of the molecules of the monomolecular layer and application of a predetermined surface pressure to the layer thus formed are carried out by transferring said layer from one compartment to the adjacent compartment by imparting rotational motion to said member which provides a separation between said compartments.

In a first embodiment of the invention, two adjacent compartments are separated by a cylinder which is rotatably mounted on a horizontal axis.

In a second embodiment of the invention, two adjacent compartments are separated by a horizontal torus which is capable of rotating about its mean circle.

It is known that a torus is a solid generated by the rotation of a circle about a straight line which is located in the plane of said circle but does not pass through its center and the "mean circle" of the torus is defined as the curve described by the center of said circle at the time of said rotation.

In one particular mode of the invention, the method permits removal of the solvent during transfer of said molecules from the compartment in which they have been introduced in solution to the adjacent compartment when said member which provides a separation between these two compartments is formed of material which does not have any affinity for said solvent.

In an advantageous mode of execution of the invention, the solution of said molecules is continuously introduced into one of said compartments, the solvent is removed, said molecules are continuously transferred from one compartment to the other by imparting rotational motion to each member which provides a separation between adjacent compartments and the monomolecular layer which has been transferred into the last compartment is continuously deposited on the substrate to be coated which passes continuously within the liquid of said last compartment.

This sequence of operations permits of continuous formation and deposition of monomolecular layers of amphiphilic molecules and this constitutes an important advantage of the invention by reason of the rapidity of execution of the method and the adaptation of this latter to continuous deposition on solids in the form of plastic or metallic bands.

In accordance with one advantageous characteristic feature of the embodiment last mentioned, the method makes it possible to modify the properties of the formed monomolecular layer by subjecting said layer to continuous treatment during its transfer from one compartment to the next either as it passes over said member or as it passes into one of said compartments.

This possibility of carrying out thermal treatments or the like on a portion of the monomolecular layer which is undergoing transfer is highly advantageous since the properties of the entire layer are modified without subjecting the entire surface of the liquid to the conditions of treatment. Moreover, it is possible to carry out in succession different treatments such as, for example, annealing treatments, polymerization treatments, drying or reorganizing treatments.

The present invention is also concerned with a device for the practical application of said method.

To this end, the device in accordance with the invention essentially comprises a tank filled with said liquid and at least one horizontal member which is partly immersed in said liquid, said member being intended to provide a separation which divides the surface of said liquid into two adjacent isolated compartments and being fitted with means for causing said member to rotate about its own axis at the surface of said liquid.

In a first embodiment, said member is a cylinder which is rotatably mounted on a horizontal axis.

In a second embodiment, said member is a horizontal flexible torus which is partly immersed at the surface of the liquid and capable of rotating about its mean circle.

In accordance with a characteristic feature of the invention, the device further comprises a means for continuously passing the substrate to be coated into the liquid of one of said compartments and immersing then withdrawing said substrate through the surface of said liquid.

As an advantageous feature, the means aforesaid is constituted by a system comprising at least three pulleys having horizontal axes so arranged that the substrate to be coated passes over each pulley in turn, at least one intermediate pulley being immersed in the liquid of said compartment.

In a first embodiment, said pulleys are arranged on parallel axes and are distributed in a first series which is immersed in the liquid of said compartment and in a second series located above the surface of said liquid, the substrate to be coated being intended to pass alternately from a pulley of the first series to a pulley of the second series.

In a second embodiment, said pulleys are distributed in a first series which is immersed in the liquid of said compartment and in a second series located above the surface of said liquid, the pulleys of each series being aligned and having coincident axes and the substrate to be coated being intended to pass alternately over a pulley of the first series and over a pulley of the second series, the same face of said substrate being always in contact with said pulleys.

In an alternative embodiment of the invention, the device further comprises a vertical partition-wall which subdivides one of said compartments, said partition-wall being partly immersed in the liquid of said compartment, and a means for continuously passing the substrate to be coated into the liquid of said compartment and immersing then withdrawing said substrate on each side of said partition-wall. Said means is advantageously constituted by a system of at least three pulleys having horizontal axes so arranged that the substrate to be coated passes over each pulley in turn, at least one of said pulleys being immersed in the liquid of said compartment and positioned in such a manner as to enable the substrate to be coated to pass beneath said partition-wall by means of said pulley.

In accordance with an advantageous feature of the invention, the rims of the pulleys have a central recess whose lateral walls are machined in such a manner as to ensure that only the extreme edges of the substrate are applied against the pulleys.

A more complete understanding of the invention will be obtained from the following description which is given by way of example without any limitation being implied, reference being made to the accompanying drawings, wherein:

FIG. 2 is a diagrammatic vertical sectional view of an alternative form of the device in accordance with the invention for depositing a single monomolecular layer on the substrate to be coated;

FIG. 3 is a diagrammatic vertical sectional view of a first embodiment of the system of pulleys which is intended to transfer the substrate to be coated in continuous motion;

FIG. 4 is a diagrammatic vertical sectional view of a pulley of said system;

FIG. 5 is a diagrammatic vertical sectional view of a second embodiment of the system of pulleys which is intended to transfer the substrate to be coated in continuous motion;

Figure 1:
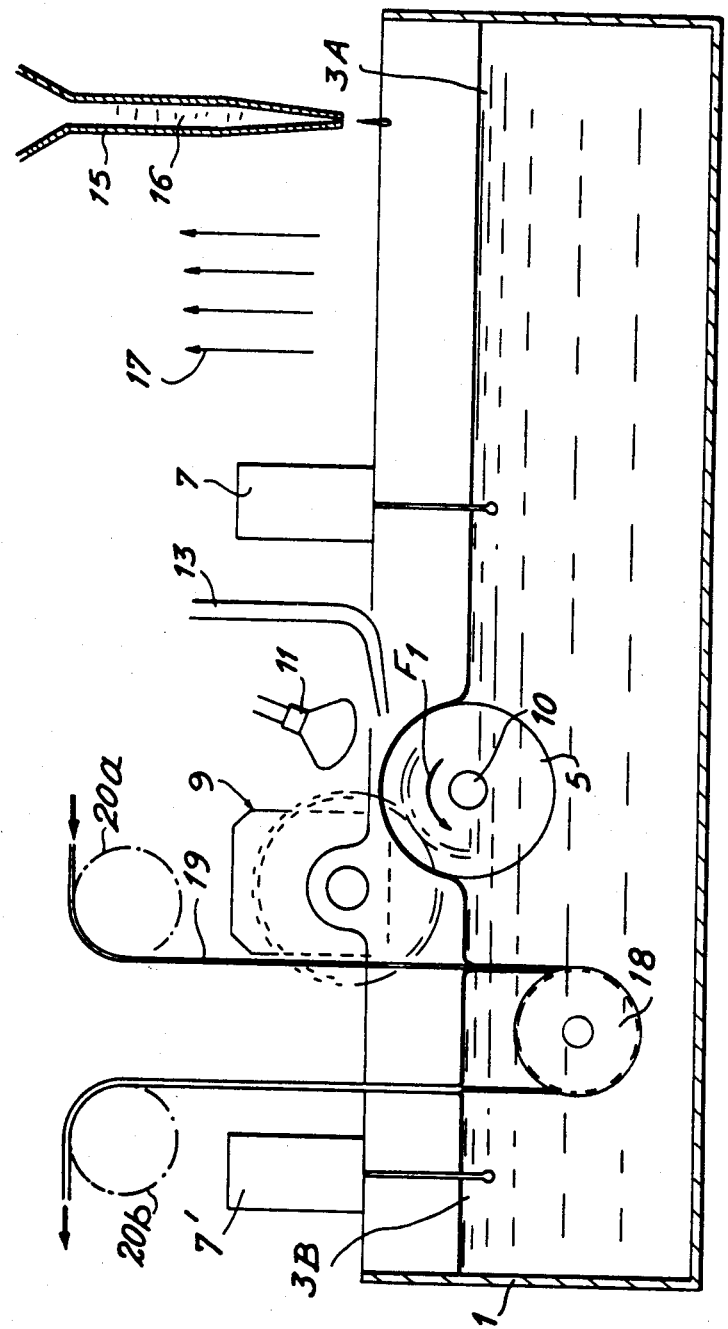
FIG. 1 is a diagrammatic vertical sectional view of the device in accordance with the invention.

Reference being made to FIG. 1, there is shown a tank of parallelepipedal shape of the same type as those normally employed for the formation of monomolecular layers by the Langmuir method.

Said tank 1 is filled with a liquid 3 such as water and is fitted with a horizontal cylinder 5 mounted on two opposite walls of the tank 1. Said cylinder 5 if half-immersed in the water 3 of the tank 1 and divides the surface of the water into two compartments 3A and 3B each provided respectively with surface pressure detectors 7 and 7'.

A motor 9 located outside the tank 1 is associated with the cylinder 5 in order to drive this latter in rotation about its shaft 10. An infrared lamp 11 is placed above the cylinder 5 in order that part of the surface of this latter may be heated. Similarly, a nozzle 13 which is capable of delivering a jet of nitrogen, for example, serves to direct said jet onto the surface of the cylinder 5.

A reservoir 15 containing a solution 16 of amphiphilic molecules which are intended to form the monomolecular layer is placed above the tank 1 in such a manner as to ensure that said solution can flow downwards drop by drop onto the surface of the water 3 of the tank 1 into the portion corresponding to the compartment 3A and that said solution is introduced at a point which is sufficiently remote from the cylinder 5 to ensure a separation between the two compartments 3A and 3B. In the compartment 3A, a drying zone 17 located between the reservoir 15 and the cylinder 5, which provides a separation between the two compartments, serves to ensure evaporation of the solvent. In that portion of the tank 1 which corresponds to the compartment 3B, provision is made for a suitable system whereby a band 19 of the substrate to be coated can be passed continuously over a pulley 18 which is immersed in the water 3 of the tank 1. This system comprises at least three pulleys 20a, 18 and 20b having horizontal axes and over which the substrate 19 to be coated is passed in turn, the intermediate pulley 18 being immersed in the water of the compartment 3B. By virtue of this arrangement of the pulleys 20a, 18 and 20b, the substrate 19 is continuously transferred in the water of the tank 1 while being introduced at right angles to the surface of the water and subsequently withdrawn therefrom in a direction which is also perpendicular to the surface of the water.

The operation of the device in accordance with the invention will now be described. By starting-up the motor 9, the cylinder 5 is caused to rotate in the direction of the arrow $F_1$, said cylinder being formed of material which does not have any affinity for the solvent. The reservoir 15 has previously been filled with a solution 16 of amphiphilic molecules such as behenic acid or α-hydroxy-docosanoic acid dissolved in a suitable solvent such as, for example hexane, chloroform or benzene. Since the end of the reservoir 15 is open, the solution 16 of amphiphilic molecules is allowed to flow drop by drop onto the surface of the water which is located within the compartment 3A. This solution spreads over the surface of the water and tends to occupy the largest possible area. As a result of the rotation of the cylinder 5, said solution is carried at the water surface towards the compartment 3B and the amphiphilic molecules which are present in solution are progressively transferred from compartment 3A to compartment 3B by passing over the surface of the cylinder 5 whilst the solvent remains within the compartment 3A and evaporates therein.

If so desired, the layer which is being transferred can be subjected as it passes over said cylinder 5 to a heat treatment by operating the lamp 11 or to a treatment with a jet of nitrogen by operating the nozzle 13.

It is apparent that the cylinder 5 selectively transfers the molecules from the solution and ensures removal of the solvent.

In some cases, however, a drying device is set into operation in the zone 17 and thus facilitates removal of the solvent.

The molecules transferred into the compartment 3B thus form a monomolecular layer and when the surface of the water of the compartment 3B is completely covered with this layer, it is observed that the indications given by the pressure detectors 7 and 7' are different and that the surface pressure of the layer has been modified as a result of this transfer process.

This modification is essentially dependent on the nature of the cylinder 5 and it has been found that the results obtained are different in the case of cylinders having the same size which are half-immersed in the liquid of the tank 1, depending on whether said cylinders are formed of a material which is wettable or not wettable by the liquid of the tank 1, or when said liquid is water, whether the cylinders are made of hydrophilic or hydrophobic material.

The following description gives the results obtained by employing cylinders 20 mm in diameter, said cylinders being formed of different materials and employed in an aqueous bath.

In a first example of construction, there is chosen a cylinder 5 of hydrophilic material, namely of Duralumin, which rotates at a velocity of ½ revolution per second and is half-immersed in the aqueous bath. In this case, the pressure of the transferred monomolecular layer rises progressively to 10 dynes/cm and when this value is attained, the movement of rotation of the cylinder 5 no longer has the effect of transferring the molecules from compartment A to compartment B and consequently maintains at a constant value the surface pressure of the layer which has been transferred into compartment B. However, if part of the molecules present in compartment B are withdrawn from the tank, the transfer is immediately resumed in order that the limiting surface pressure of 10 dynes/cm should again be attained. Thus the Duralumin cylinder effects the transfer of molecules from one compartment to another and maintains the surface pressure of the transferred layer at a constant value but it is found that the limiting pressure attained is not very high.

In a second example of construction, there is chosen a cylinder 5 which is also of hydrophilic material but of Pyrex glass, said cylinder being intended to rotate at a velocity of ½ revolution per second while being half-immersed in the aqueous bath. In this case, the pressure of the monomolecular layer which has been transferred into compartment B increases progressively to 16 dynes/cm and it is again found that, when this value is attained, the rotation of the cylinder no longer effects any transfer of molecules from compartment A to compartment B and maintains the surface pressure of the transferred layer within compartment B at this value. As in the previous instance, if part of the molecules which are present in compartment B are removed from the tank, the transfer process is immediately resumed so that the limiting surface pressure of 16 dynes/cm should again be attained.

Thus the Pyrex cylinder also effects a transfer of molecules from one compartment to the other but additionally makes it possible to attain a surface pressure of the transferred monomolecular layer of higher value than that which is obtained with a Duralumin cylinder. Similarly, said cylinder has the property of maintaining the surface pressure of the transferred layer at a constant value. The two materials employed in the foregoing serve not only to transfer the monomolecular layer but to remove the solvent since neither Pyrex nor Duralumin have any affinity for benzene or chloroform which are the solvents employed in this experiment.

In a third example of construction, there is chosen a cylinder 5 which is also of Pyrex glass and rotates at a velocity of ½ revolution per second, said cylinder being immersed in such a manner as to ensure that its axis of rotation is located at a height of approximately 5 mm above the level of the aqueous bath. In this case, the pressure of the transferred monomolecular layer rises progressively to 18 dynes/cm and it is found that the transfer properties of the cylinder remain the same as before.

In a fourth example of construction, there is chosen a cylinder 5 of hydrophobic material, namely of polyethylene and half-immersed in the aqueous bath. It is found in the case just mentioned that, by establishing a surface pressure of 5 dynes/cm in compartment A, the movement of rotation of the cylinder 5 has the effect of transferring the monomolecular layer into compartment B and that the rate of transfer is proportional to the speed of rotation of the cylinder 5. The surface pressure of the layer which is transferred into compartment B becomes very high and exceeds the maximum surface pressure which can be withstood by the monomolecular layer without damage, namely 40 dynes/cm, thus resulting in collapse of the transferred monomolecular layer. The polyethylene cylinder therefore permits a high degree of compaction of the transferred monomolecular layer.

In a fifth example of construction, there is chosen a cylinder 5 formed of Teflon, namely of hydrophobic material and half-immersed in the aqueous bath. The results obtained with this cylinder are identical with those obtained with the polyethylene cylinder.

In the two last-mentioned examples, it was found that a change in extent of immersion of the hydrophobic cylinders in the aqueous bath did not produce any modification of the results obtained.

In all cases, it has been noted that a reversal of the direction of rotation of the cylinder 5 has the effect of transferring the molecules from compartment B to compartment A.

It is apparent from the foregoing that the nature of the cylinder employed plays a very important part. As a consequence, in order to carry out the deposition of the layer on the substrate 19, there is chosen a cylinder or a series of cylinders which serve to bring the layer into the compartment B at a surface pressure which is sufficient for the deposition. Under these conditions, when the surface pressure indicated by the pressure detector 7' attains the desired value which is suitable for deposition of the monomolecular layer on the solid substrate 19, the system for continuously transferring the band 19 of substrate to be coated is started up. By suitably regulating the rate of transfer of said band and the speed of rotation of the cylinder 5 so as to adjust the quantity of molecules transferred into the compartment B, there is thus ensured continuous deposition of the monomolecular layer formed on the substrate 19.

These examples clearly show that many functions can be performed by the movement of rotation of the cylinder 5 and that the results obtained largely depend on the nature of the material which constitutes said cylinder.

However, the results also depend on the dimensions of said cylinder, on the position of its axis of rotation with respect to the level of liquid in the tank and on the speed of rotation of the cylinder.

Thus the possibilities offered by the invention vary over a very wide range and a choice of suitable conditions makes it possible to employ the rotation of said cylinder for various operations which may be combined with each other if necessary. Among these operations, there can be mentioned the transfer of molecules from one compartment to the other, adjustment of the quantity of molecules transferred, removal of the solvent, the maintaining of the surface pressure of the transferred layer at a constant value irrespective of the speed of rotation of the cylinder, the compaction of the layer, and also the execution of decompaction of said layer by utilizing the transfer function and the speed of rotation of the cylinder in order to withdraw part of the transferred molecules and to reduce the surface pressure of the transferred layer to a lower level.

Said rotary cylinder can also be employed at the level of the side walls of the tank by causing said cylinder to rotate towards the interior of the tank so as to form a fluid wall, thus preventing the molecules which are present on the surface of the water from coming into contact with the solid walls of the tank. The device is accordingly provided with horizontal cylinders which are partly immersed in the liquid, these cylinders being placed along at least part of the side walls of the tank.

It is more advantageous in some cases to divide the surface of the liquid 3 of the tank 1 into a plurality of successive adjacent compartments by choosing cylinders which are formed of different materials in order to provide a separation between each of these compartments. It is consequently possible to separate the functions of each cylinder and to obtain progressive and continuous compaction of the monomolecular layer which is transferred from the first to the last compartment.

Furthermore, in regard to the continuous deposition of the monomolecular layer on the substrate to be coated, it is possible to contemplate other forms of construction of the device in accordance with the invention with a view to enabling this latter to carry out on the substrate to be coated either the deposition of a single monomolecular layer or the deposition of a number of superposed monomolecular layers and at the same time with a view to enabling the device to deposit a first monomolecular layer in which the molecules of the layer have a given orientation with respect to the substrate. This orientation depends on the position of the polar groups of the molecules with respect to the substrate and the contact or non-contact between said polar groups and the substrate determines the two possible orientations of the first monomolecular layer deposited.

It is in fact known that the amphiphilic molecules of a monomolecular layer formed on the surface of a liquid are all oriented in the same manner and that, when this liquid is water, the hydrophilic polar groups of the molecules are in contact with the water whereas the remainder of each molecule tends to move away from the surface of the water. When a substrate which has previously been immersed in water is withdrawn, the monomolecular layer is deposited on the substrate and the deposited molecules are oriented in the direction which corresponds to the contact of the polar groups of the molecules with the substrate. Conversely, when a substrate is immersed in water, the monomolecular layer is deposited on the substrate but the molecules of said layer are oriented in the opposite direction since their polar groups are not in contact with the substrate.

In consequence, the orientation of the polar groups of the molecules of a layer deposited on a substrate which is continuously transferred within the liquid of a compartment depends on the direction of transfer of the substrate within the liquid of said compartment.

If reference is made to the case of FIG. 1, it is apparent that the substrate 19 which is passed continuously within compartment 3B is coated successively with two superposed monomolecular layers, the first layer being deposited at the time of introduction of the substrate 19 into the water of compartment 3B and the second layer being deposited at the time of withdrawal of said substrate 19 after passing over the pulley 18. As a result, the polar groups of the molecules are not in contact with the substrate in the first layer which is deposited.

Referring to FIG. 2, there is shown another embodiment of the device in accordance with the invention which precisely permits deposition of a single monomolecular layer in which the molecules are so oriented that their polar groups are in contact with the substrate.

In this case, the device further comprises a vertical partition-wall 22 which is partly immersed in the liquid of compartment 3B. Said partition-wall 22 is mounted on the two opposite walls of the tank 1 and is placed parallel to the cylinder 5. The partition-wall thus subdivides the compartment 3B into two compartments $3B_1$ and $3B_2$. The system which is intended to transfer the substrate 19 to be coated in continuous motion is constituted by a series of four pulleys 23, 24, 25 and 26 having horizontal axes over which the substrate 19 to be coated is passed successively. The pulleys 24 and 25 are immersed in the water of the tank 1 and located respectively within the compartments $3B_2$ and $3B_1$ at a lower level than that of the partition-wall 22. By virtue of this arrangement, the substrate 19 which passes successively over the pulleys 23, 24, 25 and 26 is continuously introduced into the water of compartment $3B_2$ and then continuously withdrawn from the water of compartment $3B_1$.

By virtue of the presence of the partition-wall 22, the monomolecular layer which is displaced by the cylinder 5 into the compartment $3B_1$ cannot pass into the compartment $3B_2$. By continuously transferring the substrate 19, deposition of a monomolecular layer on the substrate 19 is obtained only at the time of withdrawal of this latter from the water of compartment $3B_1$ since the surface of the water compartment $3B_2$ does not carry any monomolecular layer. A further result thereby achieved is that, in the layer which has thus been deposited, the molecules have a given orientation which corresponds to contact of their polar groups with the substrate.

This system accordingly makes it possible to deposit a single monomolecular layer in which the molecules are in contact with the substrate by means of their polar groups. It is readily apparent that, in this system, the pulleys 24 and 25 could be replaced by a single pulley placed beneath the partition-wall 22. In other cases, the system for continuously pressing the substrate into the liquid of one of the compartments is adapted to the deposition of a number of superposed monomolecular layers. FIG. 3 shows very diagrammatically a first embodiment of a system of this type. In this case, the system is also constituted by a series of pulleys having horizontal axes over which the substrate to be coated passes successively. These pulleys are distributed in a first series comprising the pulleys 31, 33 and 35 which are immersed in the water of compartment 3B and a second series comprising the pulleys 30, 32, 34 and 36 which are located above the surface of the water of compartment 3B. The substrate 19 to be coated passes alternately from a pulley of the first series to a pulley of the second series, for example from the pulley 30 to the pulley 31 and so on in sequence, said substrate being coated with a monomolecular layer each time it is introduced and each time it is withdrawn from the water to compartment 3B. Thus, in the example illustrated in FIG. 3, the continuous passage of the substrate 19 over the pulleys of the system permits the deposition of six superposed monomolecular layers on the substrate 19 and, in the first layer which is deposited, the molecules are so oriented that their polar groups are not in contact with the substrate.

In the embodiment hereinabove described, each face of the substrate 19 to be coated rests on the successive pulleys and this may have an adverse effect on the qualities of the deposited layers.

In order to overcome this disadvantage to a partial extent, preference is accordingly given to the use of pulleys which are so designed that only the extreme edges of the band of substrate to be coated rest on the pulleys. A pulley of this type is shown in vertical cross-section in FIG. 4, from which it is apparent that the rim of the pulley 40 has a central recess, the side walls of which are machined so as to form two successive annular shoulders 42 and 43. The band 19 of substrate to be coated is supported on the annular shoulders 42 and guided by the annular shoulders 43. In consequence, the central portion of the band is in no way liable to come into contact with the rim of the pulley 40.

Another arrangement which can be adopted with a view to circumventing the above-mentioned disadvantage consists in modifying the arrangement of the pulleys in such a manner as to ensure that only one face of the substrate bears on these latter whereas, on the other face of the substrate, the deposited monomolecular layers are protected against any contact with the pulleys.

FIG. 5 illustrates a system of pulleys which have been designed for this purpose. Accordingly, a first series of pulleys 53, 55, 57 having horizontal axes is immersed in the water of compartment 3B and the pulleys of this series are so arranged that their axes coincide. A second series of pulleys 50, 52, 53, 56 and 58 having horizontal axes is placed above the surface of the water of compartment 3B. Among these latter, the end pulleys 50 and 58 are so arranged that their axes are parallel and the pulleys 52, 54 and 56 are so arranged that their axes coincide, the axis which is common to the pulleys 52, 54 and 56 being parallel to the common axis of the pulleys 53, 55 and 57. The substrate 19 which is conveyed by the first pulley 50 passes successively over the pulleys 52, 53, 54, 55, 56, 57 and is discharged by the pulley 58. In this manner, only one face of the substrate 19 is in contact with the pulleys. On the other face of said substrate, the deposited monomolecular layers are thus in no way liable to come into contact with the rims of the pulleys.

In the examples of construction last mentioned, the molecules of the first deposited layer are oriented in such a manner as to ensure that their polar groups are not in contact with the substrate. If it is desired on the contrary to carry out the deposition of a number of superposed layers in which the first layer is oriented in the opposite direction, the device illustrated in FIG. 2 is accordingly employed and completed in compartment 3B₁ by a system of pulleys of the type shown in FIG. 3 or in FIG. 5. In this manner, after a first withdrawal from the water of compartment 3B₁, the substrate 19 can pass several times across the surface of the water of compartment 3B₁ and thus be coated with several superposed monomolecular layers.

In all the embodiments which are illustrated and described in the foregoing, the immersed pulleys are advantageously formed of inert material such as polytetrafluoroethylene.

Figure 6:
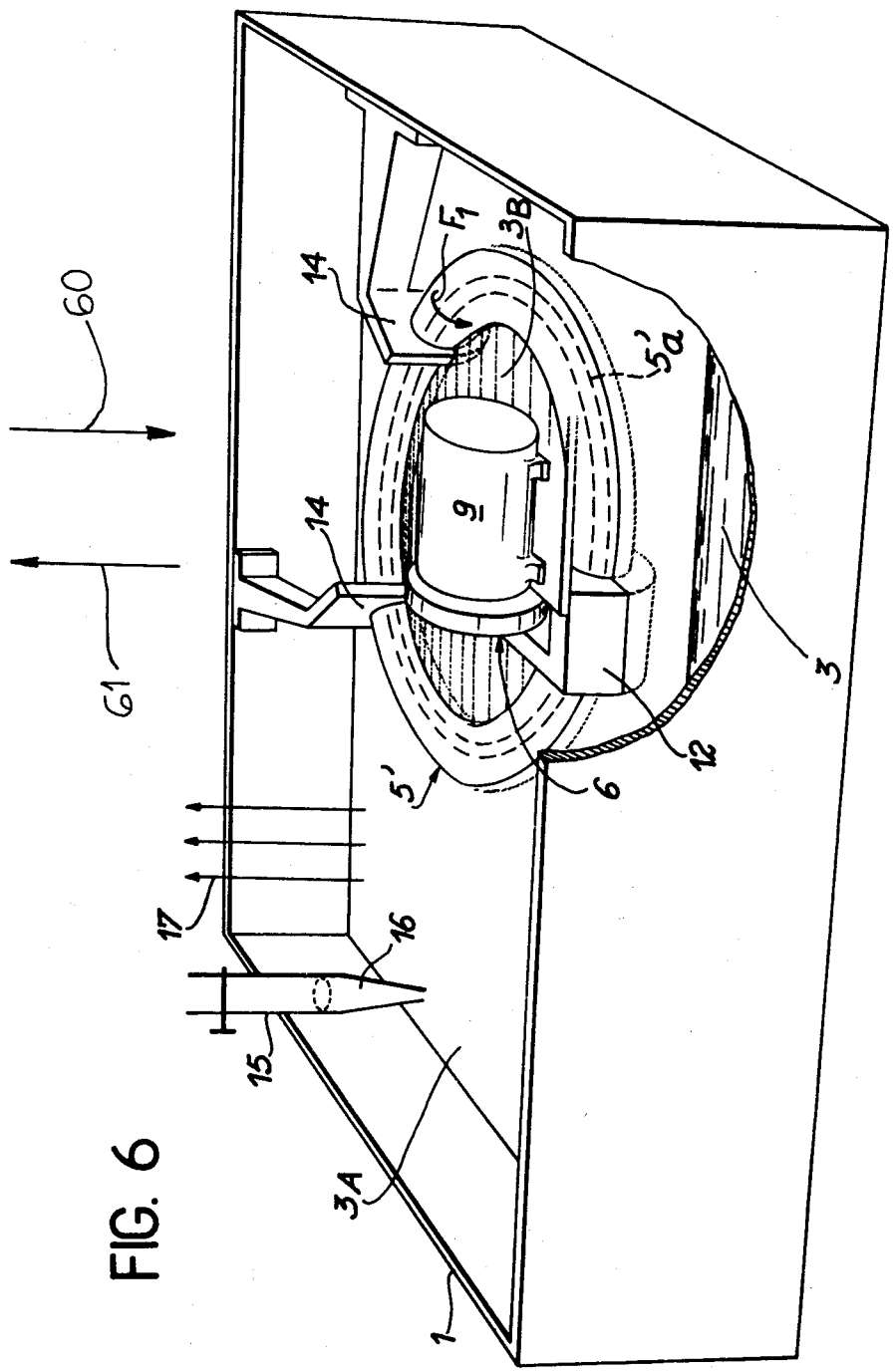
FIG. 6 is a diagrammatic view in perspective showing another alternative form of the device in accordance with the invention, in which a torus serves to separate the surface of the liquid into two compartments.
Figure 7:
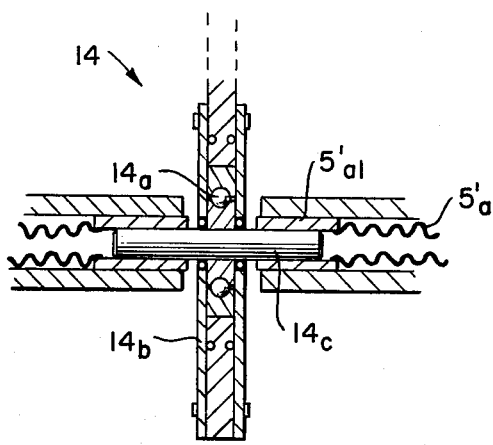
FIG. 7 is a diagrammatic vertical sectional view of a module for supporting the torus of FIG. 6.
Figure 8:
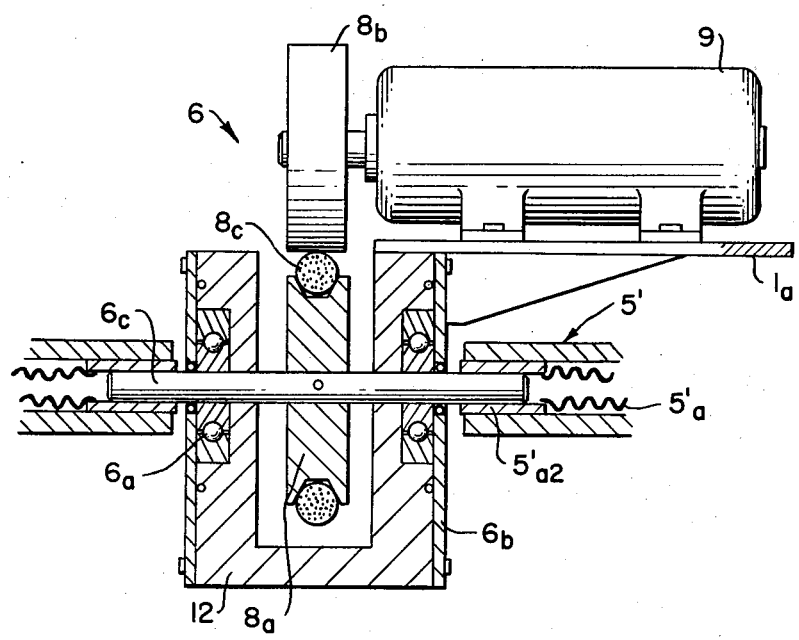
FIG. 8 is a diagrammatic vertical sectional view of the driving unit for the torus of FIG. 6.

Referring now to FIGS. 6, 7 and 8, there is shown an alternative form of construction of the device in accordance with the invention in which the cylinder employed for dividing the surface of the tank into two compartments has been replaced by a torus. This device comprises a tank 1 filled with a liquid 3 such as water, the surface of which is divided into two compartments 3A and 3B by a torus 5' which is partly immersed in liquid 3.

Said torus 5' is constituted by a flexible bellows element which is formed, for example, of a thin-walled flexible cylindrical tube which transmits torques, said element being covered with a sheath made of hydrophobic plastic material (sheath of elastomer, silicone, plastic or rubber which may have a surface treatment in order to modify the hydrophilic or hydrophobic character of the sheath). The depth of immersion is so adjusted to ensure that the torus has zero weight under operating conditions. In this manner, the modules 14 for supporting said torus can be given maximum relative spacing. Thus in the case of a torus having a circular cross-section 2 cm in diameter and a mean circle 80 cm in diameter, only three supporting modules are required.

In an alternative economical embodiment of the method, the core of the torus 5'a is constituted by a conventional flexible cable of the helical multiple-strand type formed of steel or of polyamide of the nylon type which is capable of transmitting torques.

The torus is thus constituted by removable sections separated by rigid supporting modules 14. These supporting modules are rigidly fixed to the tank walls and each constituted by a bearing 14a protected by leak-tight end-plates 14b, there being fixed within the internal cage of said bearing a shaft 14c on which the endpiece 5'a₁ of the internal tube of the torus is intended to be fixed (as shown in FIG. 7). The torus is displaced in rotational motion by means of a driving unit 6 which is rigidly fixed to the tank walls and constituted by a hollow leak-tight metal box 12, there being placed in the walls of said box two aligned bearings 6a protected by leak-tight end-plates 6b. There is fixed within the internal cage of the bearings a common shaft 6c on which the endpieces 5'a₂ of the internal tube 5'a of the torus are intended to be fixed. A pulley 8a is fixed on the free portion of the shaft 6c within the box 12, said pulley being driven in rotation by a reduction-gear motor 9 mounted on a support 1a (shown in FIG. 8) by means of a wheel 8b, a torus 8c being mounted on the pulley 8a and interposed between this latter and the wheel 8b.

The operation of the device is as follows:

The solution 16 of amphiphilic molecules is poured drop by drop onto the surface of the water of compartment 3A and the reduction-gear motor 9 is started up so as to initiate rotational motion of the torus 5' on its own axis in the direction indicated by the arrow F₁, for example at a speed of 1 revolution per second in the case of a torus of polyethylene. The solution spreads over the surface of the water and the solvent can evaporate in the drying zone 17. Under the influence of rotational motion of the torus 5', the monomolecular layer formed by removal of the solvent is displaced within the compartment 3B and the surface pressure of the layer which is present within compartment 3B rises rapidly in the same manner as mentioned above in the case of cylinders of hydrophobic material. When said surface pressure attains the desired value, said layer is deposited on a substrate which is transferred continuously within the compartment 3B by a system of pulleys for immersing the substrate through the surface of the liquid in the compartment in the direction shown by arrow 60 and then withdrawing the substrate in the direction shown by arrow 61.

In the embodiment just mentioned, it is apparent that the monomolecular layer which is compacted within compartment 3B is not in contact with a stationary wall of the vessel 1 and is therefore not subject to any damage which might otherwise be liable to take place as a result of rubbing contact with a fixed wall of the tank.

In the examples described in the foregoing, the liquid of the tank is water. It is possible, however, to employ other liquids such as polar or non-polar liquids, a molten metal or alloy, depending on the nature of the molecules which are intended to form the layer.

Similarly, it is possible to contemplate the use of other solvents provided that they are not miscible with the liquid of the tank and they are not liable to attack the material which forms the cylinder on the torus.

What we claim is:

1. A device for forming and depositing a monomolecular layer of amphiphilic molecules on a substrate which comprises
   (1) a tank for containing a liquid,
   (2) at least one cylinder which is rotatably mounted on a horizontal axis and adapted to be partly immersed in said liquid, said cylinder or cylinders being intended to provide a separation which divides the surface of said liquid into at least first and second adjacent isolated compartments,
   (3) means for feeding a solution of amphiphilic molecules to the liquid surface of said first compartment, and
   (4) means for causing said cylinder or cylinders to rotate about their own axes thereby to transfer a monomolecular layer from the liquid surface of said first compartment to at least the liquid surface of said second compartment.

2. A device according to claim 1, wherein said device further comprises means for continuously passing the substrate to be coated into the liquid of one of said compartments by immersing then withdrawing said substrate through the surface of the liquid of said compartment.

3. A device according to claim 2, wherein the cylinder is formed of material which is wetted by the liquid of the tank.

4. A device according to claim 3, wherein the material of the cylinder is constituted by glass or aluminum or aluminum alloys and wherein the tank is filled with an aqueous bath.

5. A device according to claim 2, wherein the cylinder is formed of material which is not wetted by the liquid of the tank.

6. A device according to claim 5, wherein the material of the cylinder is constituted by polyethylene or polytetrafluoroethylene and wherein the tank is filled with an aqueous bath.

7. A device according to claim 2, wherein said member is half-immersed in the liquid of said tank.

8. A device according to claim 2, wherein said device further comprises a vertical partition-wall which subdivides one of said compartments, said partition-wall being adapted to be partly immersed in the liquid of said one of said compartments, and said means for continuously passing the substrate being adapted for immersing said substrate on one side of said partition-wall and then withdrawing said substrate on the other side of said partition-wall.

9. A device according to claim 8, wherein the means for passing the substrate into the liquid of said compartment is constituted by a system of at least three pulleys having horizontal axes so arranged that the substrate to be coated passes over each pulley in turn, at least one of said pulleys being adapted to be immersed in the liquid of said compartment and positioned in such a manner as to enable the substrate to be coated to pass beneath said partition-wall by means of said pulley.

10. A device according to claim 2, wherein said means for continuously passing the substrate comprises at least three pulleys having horizontal axes so arranged that the substrate to be coated passes over each pulley in turn, at least one intermediate pulley being adapted to be immersed in the liquid of said compartment.

11. A device according to claim 10, wherein said pulleys are arranged on parallel axes and wherein said pulleys are distributed in a first series which is adapted to be immersed in the liquid of said compartment and in a second series located above the surface of said liquid, the substrate to be coated being intended to pass alternately from a pulley of the first series to a pulley of the second series.

12. A device according to claim 11, wherein said pulleys are distributed in a first series which is adapted to be immersed in the liquid of said compartment and in a second series located above the surface of said liquid, the pulleys of each series being aligned and having coincident axes and the substrate to be coated being intended to pass alternately over a pulley of the first series and over a pulley of the second series, the same face of said substrate being always in contact with said pulleys.

13. A device according to claim 10, wherein the rims of the pulleys have a central recess whose lateral walls are machined in such a manner as to ensure that only the extreme edges of the substrate are applied against said pulleys.

14. A device according to claim 2, wherein said device further comprises horizontal cylinders which are adapted to be partly immersed in said liquid, said cylinders being disposed along at least part of the walls of said tank and being capable of rotating about their own axes.

15. A device for forming and depositing a monomolecular layer of amphiphilic molecules on a substrate which comprises
   (1) a tank for containing a liquid,
   (2) at least one horizontal torus which is adapted to be partly immersed in said liquid, said torus or tori being intended to provide a separation which divides the surface of said liquid into at least first and second adjacent isolated compartments,
   (3) means for feeding a solution of amphiphilic molecules to the liquid surface of said first compartment, and
   (4) means for causing said torus or tori to rotate about their mean circle thereby to transfer a monomolecular layer from the liquid surface of said first compartment to at least the liquid surface of said second compartment.

16. A device according to claim 15, wherein the torus is constituted by a flexible bellows-type tube or a flexible cable disposed on the mean circle of said torus and covered with a sheath of deformable or plastic material, said torus being driven in rotation on its own axis by means of a driving unit which is rigidly fixed to said tube or cable and actuated by an external motor.

17. a device according to claim 15, wherein said device further comprises means for continuously passing the substrate to be coated into the liquid of one of said compartments by immersing then withdrawing said substrate through the surface of the liquid of said compartment.

18. A device according to claim 17, wherein said torus is half-immersed in the liquid of said tank.

* * * * *